US012614034B2

(12) United States Patent
Little et al.

(10) Patent No.: US 12,614,034 B2
(45) Date of Patent: Apr. 28, 2026

(54) SCALABLE SYSTEMS AND METHODS FOR CONTEXT-AWARE SENSITIVE DATA DETECTION, HIERARCHICAL LABELING, AND PROTECTION IN NATURAL LANGUAGE PROCESSING ENVIRONMENTS

(71) Applicant: Anonos IP LLC, Beaverton, OR (US)

(72) Inventors: Mark Little, Matthews, NC (US); Omar Ali Fdal, Berlin (DE); Ted N. Myerson, New York, NY (US); Malcolm Gary LaFever, Lyons, CO (US); Jeff Weishaupt, Lakeland, FL (US)

(73) Assignee: Anonos Innovations LLC, Plano, TX (US)

( * ) Notice: Subject to any disclaimer, the term of this patent is extended or adjusted under 35 U.S.C. 154(b) by 0 days.

(21) Appl. No.: 19/310,518

(22) Filed: Aug. 26, 2025

(65) Prior Publication Data

US 2026/0057176 A1 Feb. 26, 2026

Related U.S. Application Data

(60) Provisional application No. 63/687,168, filed on Aug. 26, 2024.

(51) Int. Cl.
*G06F 40/35* (2020.01)
*G06F 16/353* (2025.01)
*G06F 40/284* (2020.01)
*G06F 40/30* (2020.01)

(52) U.S. Cl.
CPC .......... *G06F 40/284* (2020.01); *G06F 16/353* (2019.01); *G06F 40/30* (2020.01)

(58) Field of Classification Search
CPC ...... G06F 40/279; G06F 40/35; H04W 12/02; H04W 12/03
See application file for complete search history.

(56) References Cited

U.S. PATENT DOCUMENTS

| | | | | | |
|---|---|---|---|---|---|
| 11,030,341 | B2 * | 6/2021 | LaFever | .............. | H04L 63/0407 |
| 12,387,007 | B2 * | 8/2025 | Monaco | ................ | G06F 40/284 |
| 12,413,664 | B2 * | 9/2025 | K M | .................... | G10L 15/1815 |
| 2015/0096039 | A1 * | 4/2015 | Mattsson | ................ | G06F 21/64 726/26 |
| 2020/0334381 | A1 * | 10/2020 | Yarowsky | ............. | G06F 40/166 |
| 2023/0054446 | A1 * | 2/2023 | LaFever | ................ | H04W 12/75 |
| 2024/0184912 | A1 * | 6/2024 | Dong | .................... | G06F 40/284 |

* cited by examiner

*Primary Examiner* — Daniel Abebe
(74) *Attorney, Agent, or Firm* — Blank Rome LLP

(57) ABSTRACT

The present disclosure relates to scalable systems and methods for detecting, labeling, and protecting sensitive data in natural language processing (NLP) environments. This includes NLP applications in artificial intelligence (AI) systems, such as language models (LMs) and generative AI (GenAI). More particularly, the present disclosure introduces a hierarchical, context-aware labeling mechanism that is optimized using an LM in conjunction with machine learning (ML) techniques to ensure the utility-preserving effective protection of sensitive data with, for example, minimal false positives and false negatives and/or optimal precision and recall (e.g., in terms of an F1 Score).

27 Claims, 4 Drawing Sheets

END-TO-END SECURITY FOR SENSITIVE INFORMAITON IN LMs

100

REFERENCE DATA 102

INGESTION-TIME DETECTION, LABELING, AND TOKENIZATION 104

VECTOR DB 106

QUERY-TIME DETECTION AND CLASSIFICATION 110

QUERY 108

QUERY-TIME AUTHORIZATION 112

QUERY-TIME SEMANTIC ENTITY TOKENIZATION 114

LANGUAGE MODEL (LM) 116

RESPONSE-TIME GOVERNANCE AND SELECTIVE DISCLOSURE 118

RESPONSE 120

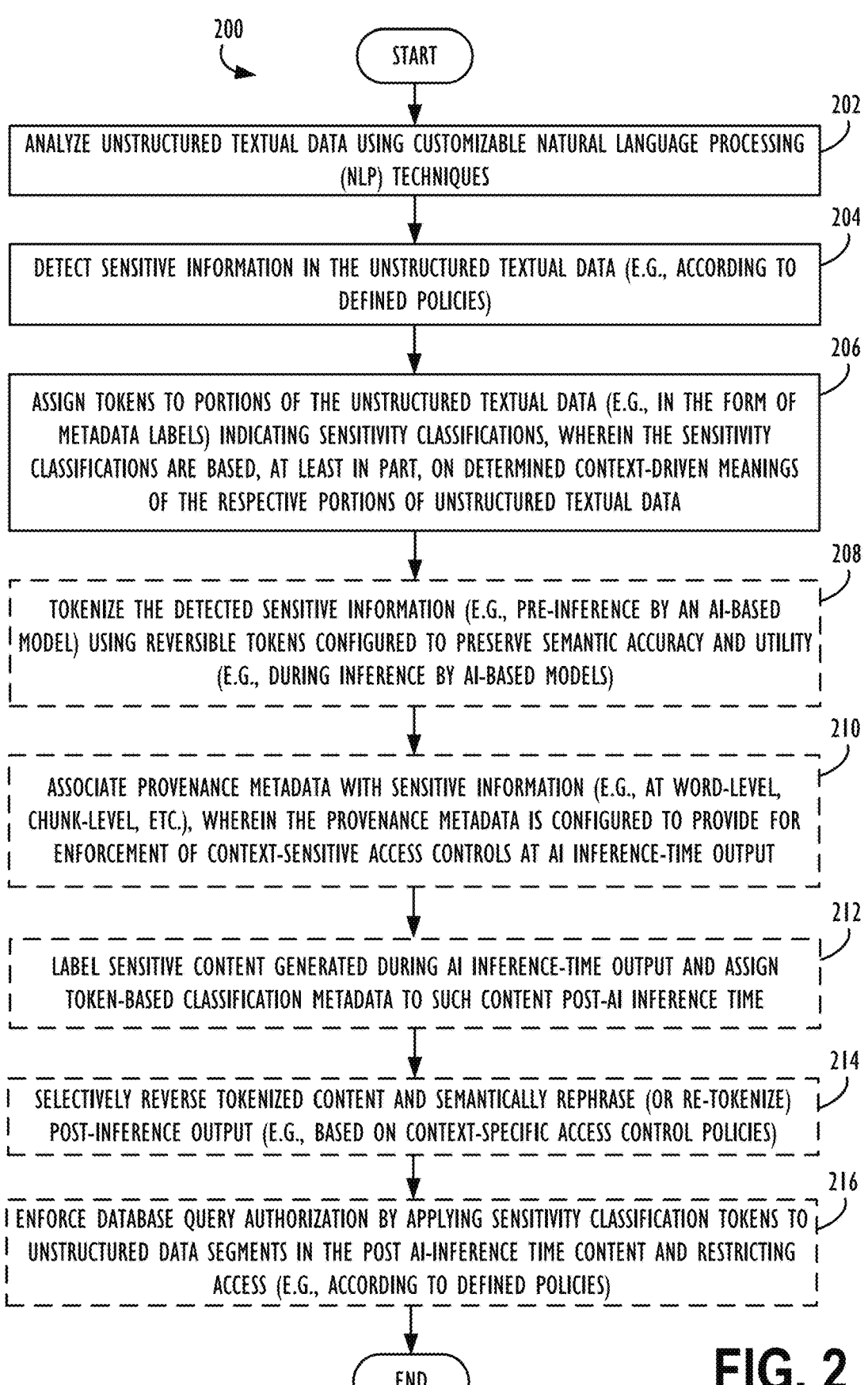

*200*

START

202

ANALYZE UNSTRUCTURED TEXTUAL DATA USING CUSTOMIZABLE NATURAL LANGUAGE PROCESSING (NLP) TECHNIQUES

204

DETECT SENSITIVE INFORMATION IN THE UNSTRUCTURED TEXTUAL DATA (E.G., ACCORDING TO DEFINED POLICIES)

206

ASSIGN TOKENS TO PORTIONS OF THE UNSTRUCTURED TEXTUAL DATA (E.G., IN THE FORM OF METADATA LABELS) INDICATING SENSITIVITY CLASSIFICATIONS, WHEREIN THE SENSITIVITY CLASSIFICATIONS ARE BASED, AT LEAST IN PART, ON DETERMINED CONTEXT-DRIVEN MEANINGS OF THE RESPECTIVE PORTIONS OF UNSTRUCTURED TEXTUAL DATA

208

TOKENIZE THE DETECTED SENSITIVE INFORMATION (E.G., PRE-INFERENCE BY AN AI-BASED MODEL) USING REVERSIBLE TOKENS CONFIGURED TO PRESERVE SEMANTIC ACCURACY AND UTILITY (E.G., DURING INFERENCE BY AI-BASED MODELS)

210

ASSOCIATE PROVENANCE METADATA WITH SENSITIVE INFORMATION (E.G., AT WORD-LEVEL, CHUNK-LEVEL, ETC.), WHEREIN THE PROVENANCE METADATA IS CONFIGURED TO PROVIDE FOR ENFORCEMENT OF CONTEXT-SENSITIVE ACCESS CONTROLS AT AI INFERENCE-TIME OUTPUT

212

LABEL SENSITIVE CONTENT GENERATED DURING AI INFERENCE-TIME OUTPUT AND ASSIGN TOKEN-BASED CLASSIFICATION METADATA TO SUCH CONTENT POST-AI INFERENCE TIME

214

SELECTIVELY REVERSE TOKENIZED CONTENT AND SEMANTICALLY REPHRASE (OR RE-TOKENIZE) POST-INFERENCE OUTPUT (E.G., BASED ON CONTEXT-SPECIFIC ACCESS CONTROL POLICIES)

216

ENFORCE DATABASE QUERY AUTHORIZATION BY APPLYING SENSITIVITY CLASSIFICATION TOKENS TO UNSTRUCTURED DATA SEGMENTS IN THE POST AI-INFERENCE TIME CONTENT AND RESTRICTING ACCESS (E.G., ACCORDING TO DEFINED POLICIES)

END

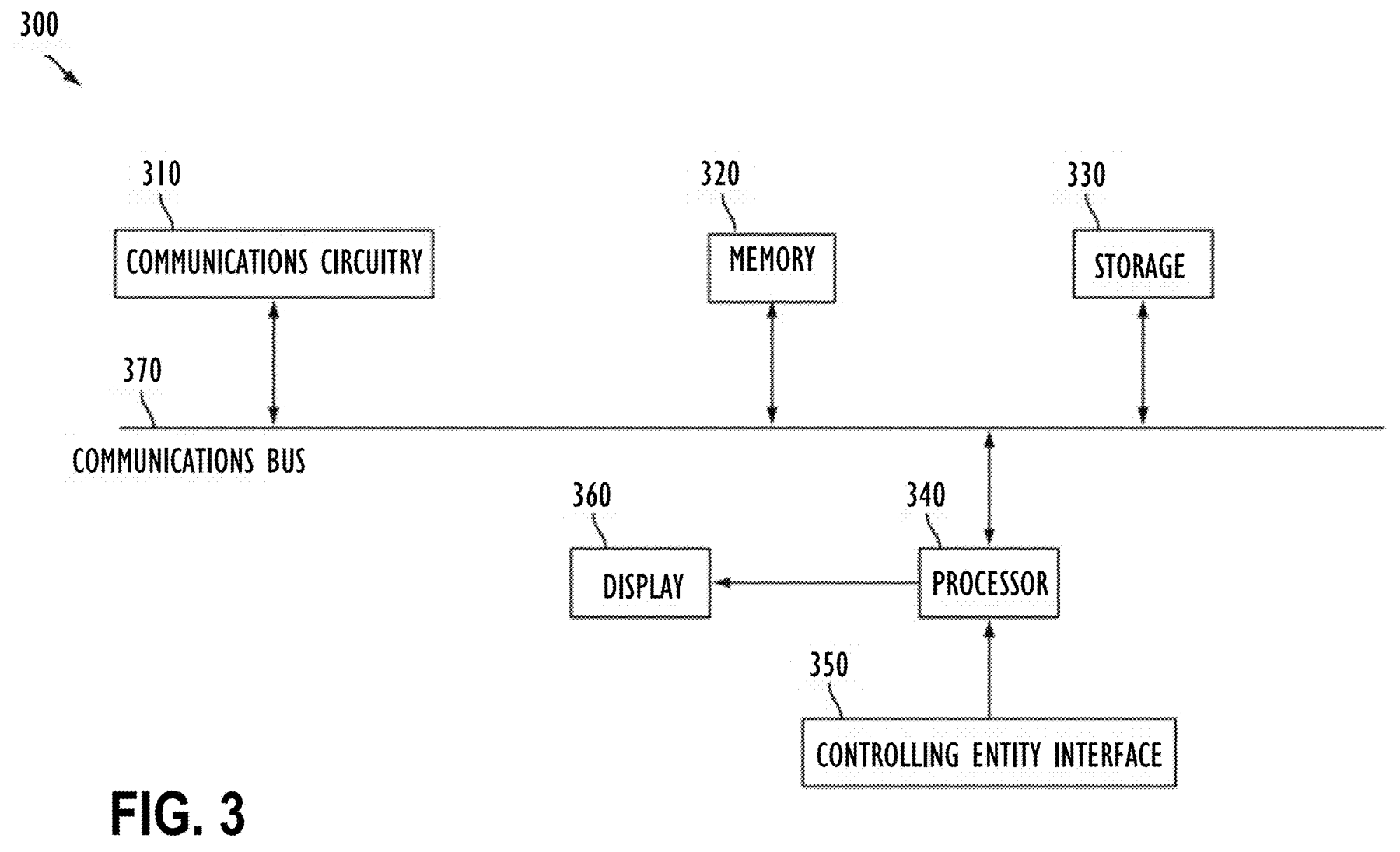

310 COMMUNICATIONS CIRCUITRY

370 COMMUNICATIONS BUS

320 MEMORY

330 STORAGE

340 PROCESSOR

350 CONTROLLING ENTITY INTERFACE

360 DISPLAY

FIG. 3

SCALABLE SYSTEMS AND METHODS FOR CONTEXT-AWARE SENSITIVE DATA DETECTION, HIERARCHICAL LABELING, AND PROTECTION IN NATURAL LANGUAGE PROCESSING ENVIRONMENTS

CROSS-REFERENCE TO RELATED APPLICATIONS

This application claims the benefit of U.S. Provisional Patent Application No. 63/687,168, filed Aug. 26, 2024, entitled, "Scalable Systems and Methods for Context-Aware Sensitive Data Detection, Hierarchical Labeling, and Protection in Natural Language Processing Environments" (hereinafter, "the '168 application"), the disclosure of which is incorporated herein by reference in its entirety.

FIELD OF THE INVENTION

The present disclosure relates to scalable systems and methods for detecting, labeling, and protecting sensitive data in natural language processing (NLP) environments. This includes NLP applications in artificial intelligence (AI) systems, such as small language models (SLM), large language models (LLMs) (collectively, SLMs and LLMs are referred to herein as language models or "LMs") and generative AI (GenAI). More particularly, the present disclosure introduces a hierarchical, context-aware labeling mechanism that is optimized using an LM in conjunction with machine learning (ML) techniques to ensure the utility-preserving effective protection of sensitive data with, for example, minimal false positives and false negatives and/or optimal precision and recall (e.g., in terms of an F1 Score).

BACKGROUND

This section is intended to provide a background or context to the invention that is recited in the claims. The description herein may include concepts that could be pursued, but which are not necessarily ones that have been previously conceived, implemented or described. Therefore, unless otherwise indicated herein, what is described in this section is not prior art to the description and claims in this application and is not admitted as being prior art by inclusion in this section.

There are certain inherent conflicts between: (i) the goal of parties, particularly business entities, to maximize the value of data and their goals of respecting privacy rights of individuals and the security interests of their organizations; (ii) the goal of individuals to protect their privacy rights and their goal of benefiting from highly personalized offerings; (iii) the goal of organizations to protect their security interests in sensitive data and their goal of maximizing the benefits of AI and LMs, and (iv) the goal of U.S. and international government agencies to facilitate research and commerce and their goal of safeguarding rights of citizens and organizations.

The development, emergence, and widespread adoption of computer networks, internets, intranets and supporting technologies has resulted in the wide-spread availability of cost-effective technology to collect, transmit, store, analyze and use information in electronic formats. As a result, entities now have the ability to readily collect and analyze vast amounts of information. This has created tensions between: (a) the increasing quantity of information available to qualify prospects, develop personalized/customized offerings for potential customers and/or conduct health-related or other research; and (b) decreasing security, anonymity and privacy for individuals and organizations who often are not aware of the existence of many data elements that may be traced back to their origin, and over which they often have little or no effective control.

Data elements may be collected both online and offline (i.e., both "born digital" and "born analog" and converted into digital format at a later date) through a variety of sources including, but not limited to, activity on social networking sites, electronic or digital records, emails, participation in rewards or bonus card programs that track purchases and locations, browsing or other activity on the Internet, and activity and purchases at brick-and-mortar stores and/or on e-commerce websites. Merchants, medical-related and other service providers, governments, and other entities use this tremendous amount of data that is collected, stored, and analyzed to suggest or find patterns and correlations and to draw useful conclusions, e.g., which types of customers (and/or which particular customers) to direct targeted advertising efforts towards. This data is sometimes referred to as "big data," due to the extensive amount of information entities may now gather. With big data analytics, entities may now unlock and maximize the value of data. One example may involve non-health related entities engaging in behavioral marketing (with materials created for distribution being customized in an attempt to increase the correlation with the preferences pertaining to a particular recipient party), and another example may involve health-related entities accessing big data to conduct medical research. However, with behavioral marketing and big data analytics, related parties now have a much lower level of privacy and anonymity.

Attempts at reconciling the conflict between privacy/security/anonymity and value/personalization/research have historically involved using alternative identifiers rather than real names or identifying information. However, these alternative identifiers are generally statically assigned and persist over time. Static identifiers are more easily tracked, identified, and cross-referenced to ascertain true identities/data sources, and they may be used to ascertain additional data about subjects associated with data elements without the consent of related parties. Privacy and information experts have expressed concerns that re-identification techniques may be used with data associated with static identifiers and question whether data that is identifiable with specific computers, devices or activities (i.e., through associated static identifiers) can in practice be considered anonymous or maintained in a protected state of anonymity. When an identifier does not change over time, adversarial entities have unlimited time to accrete, analyze and associate additional or even exogenous data with the persistent identifier, and thus to determine the true identity of the subject and associate other data with the true identity. In addition, unlimited time provides adversarial entities with the opportunity to perform time-consuming brute-force attacks that can be used against any encrypted data.

Many potential benefits from artificial intelligence (AI) and big data have not been fully realized due to ambiguity regarding ownership/usage rights of underlying data, tensions regarding privacy of underlying data, and consequences of inaccurate analysis due to erroneous data collected from secondary (versus primary) sources and/or inferred from activities of parties without active participation of, or verification by, said parties. Moreover, consumers are now frequently demanding selective and variable controls that enable increased engagement with trusted business entities, while protecting personal/sensitive information from misuse by unauthorized or non-trusted business entities. (As used herein, "business entities" can refer to businesses or organizations of any kind, including for-profit organizations, not-for-profit organizations, governmental entities, NGOs (non-governmental organizations), any third-party entity.) At the same time, business entities are facing the need to overcome potential legal, privacy, and security challenges, while complying with evolving legal and privacy guidelines (e.g., without limitation, the EU General Data Protection Regulation (GDPR), the EU AI Act, and the California Consumer Privacy Act (CCPA)), regulations, and/or laws to unlock digital economic growth in a societally-beneficial way, i.e., such that Data Subject protections are increased, while opportunities for business entities to reach Data Subjects having interest in relevant products and services are also increased, thus increasing those businesses' return on investment in advertising and marketing costs.

GDPR Article 4 (5) defines "Pseudonymization" as requiring separation of the information value of data from the risk of re-identification. To benefit from GDPR statutory/regulatory incentives and rewards for pseudonymization, this separation is necessary. Replacing multiple occurrences of the same personal data elements (e.g., name of a Data Subject) with "static" (or persistent) tokens fails to separate the information value of data from the risk of re-identification because re-identifying correlations and linkage attacks (aka the "Mosaic Effect") are possible due to "static" (or persistent) identifiers being used instead of dynamic de-identifiers.

Static tokenization approaches to protecting data use persistent identifiers. By searching for a particular, tokenized string that repeats itself within or across databases, a malicious actor or interloper can gain enough information to unmask the identity of a Data Subject. This is an increasing scope problem for analytics and other processes that combine and blend internal and external data sources. By contrast, if a data element is replaced each time it is stored with a different pseudonymized token, e.g., a dynamic token, also referred to herein as a "temporally unique dynamically changing de-identifier" or "DDID," where each different DDID bears no algorithmic relationship to the others, then the same malicious actor or interloper can no longer determine that the DDIDs belong or relate to the same Data Subject-let alone uncover a Data Subject's name or other identifying information.

DDIDs may each be associated with a subject, e.g., a person, place, or thing (e.g., an event, document, contract, or "smart contract"), to which data directly or indirectly pertains or relates (a "Data Subject"), and/or an action, activity, process and/or trait pertaining to a Data Subject, for a temporally unique period of time, thereby enabling the Data Subject to operate in a "dynamically anonymous" manner. "Dynamically anonymous" or "Dynamic Anonymity" as used herein, refers to a user's ability to maintain anonymity until such time as a decision is made not to remain anonymous, at which time only the desired information is shared with one or more desired parties in connection with one or more actions, activities, processes or traits. DDIDs are described further, e.g., in the commonly-assigned U.S. Pat. No. 12,093,426, issued Sep. 17, 2024, and which is hereby incorporated by reference in its entirety (hereinafter, "the '426 patent").

What are needed are systems, methods and devices that overcome the limitations of static and/or persistent privacy/anonymity and security systems and improve the accuracy of data for exchange, collection, transactions, analysis (including by AI models, such as LMs) and other uses. Put another way, privacy/security/anonymity-enhancing technologies, such as those described herein, can help to reconcile the tensions between consumers' desires for enhanced privacy, organization's desires for enhanced security and business entities' desires for access to (and AI-based processing of) relevant information, e.g., by providing tools that enable the ability of an authorized user to unlock the "true" meaning of such information only to the extent necessary, and only in certain situations, e.g., only during a particular time interval and/or in a particular context.

SUMMARY

Embodiments disclosed herein may include detecting, labeling, and protecting sensitive data in natural language processing (NLP) environments. This includes NLP applications in artificial intelligence (AI) systems, such as small language models (SLMs), large language models (LLMs), and generative AI (GenAI). More particularly, the present disclosure introduces a hierarchical, context-aware labeling mechanism that is optimized using an AI model, such as an LM, in conjunction with machine learning (ML) techniques to ensure the utility-preserving effective protection of sensitive data with, for example, minimal false positives and false negatives and/or optimal precision and recall (e.g., in terms of an F1 Score).

The present disclosure also introduces a hierarchical labeling system that applies labels at multiple levels (e.g., word-level, chunk/phrase-level, and/or document-level) and different constructs (e.g., content versus sensitivity) to enable granular, context-sensitive protection of sensitive information.

The techniques disclosed herein present novel approaches for protecting unstructured data used in processing and analysis by AI models by leveraging the latent semantic structure within unstructured text—e.g., documents, entities, and chunks—to enable the use of well-established governance and security architectures. Moreover, the latent semantic structure of the underlying data enables entity-level reversible protection, thereby empowering AI models to confidently reason over sensitive data-without compromising accuracy, security, or analytic utility.

The systems, frameworks, and other modules disclosed herein, may be implemented in program code executed by a processor, or in another computer. The program code may be stored on a computer readable medium, accessible by the processor. The computer readable medium may be volatile or non-volatile, and it may be removable or non-removable. The computer readable medium may be, but is not limited to, RAM, ROM, solid state memory technology, Erasable Programmable ROM ("EPROM"), Electrically Erasable Programmable ROM ("EEPROM"), CD-ROM, DVD, magnetic cassettes, magnetic tape, magnetic disk storage or other magnetic or optical storage devices.

In certain embodiments, privacy/security clients for implementing these systems, frameworks, and techniques may reside in, or be implemented using, so-called "smart" devices (e.g., wearable, movable or immovable electronic devices, generally connected to other devices or networks via different protocols such as Bluetooth, NFC, Wi-Fi, 3G, Long Term Evolution (LTE), New Radio (NR), etc., that can operate to some extent interactively and autonomously), smartphones, tablets, notebooks and desktop computers, and privacy/security clients may communicate with one or more servers that process and respond to requests for information from clients, such as requests regarding data attributes, attribute combinations and/or data attribute-to-Data Subject associations (wherein a "Data Subject" refers to any individual person, place, or thing that can be identified, directly or indirectly, via an identifier, or combinations of identifiers, related to a name, an ID number, location data, or via factors, e.g., factors specific to the person, place, or thing's physical, physiological, genetic, mental, economic, geographic, cultural, or social identity, location, behavior or attribute).

Other embodiments of the disclosure are described herein. The features, utilities and advantages of various embodiments of this disclosure will be apparent from the following more particular description of embodiments as illustrated in the accompanying drawings.

BRIEF DESCRIPTION OF THE DRAWINGS

FIG. 2 illustrates a flowchart, showing a method of performing end-to-end security for sensitive information in LLMs, in accordance with one or more embodiments disclosed herein.

FIG. 3 illustrates a block diagram of an example of a programmable device for implementing techniques for performing end-to-end security for sensitive information in LLMs, in accordance with one or more embodiments disclosed herein.

DETAILED DESCRIPTION

Figure 1:
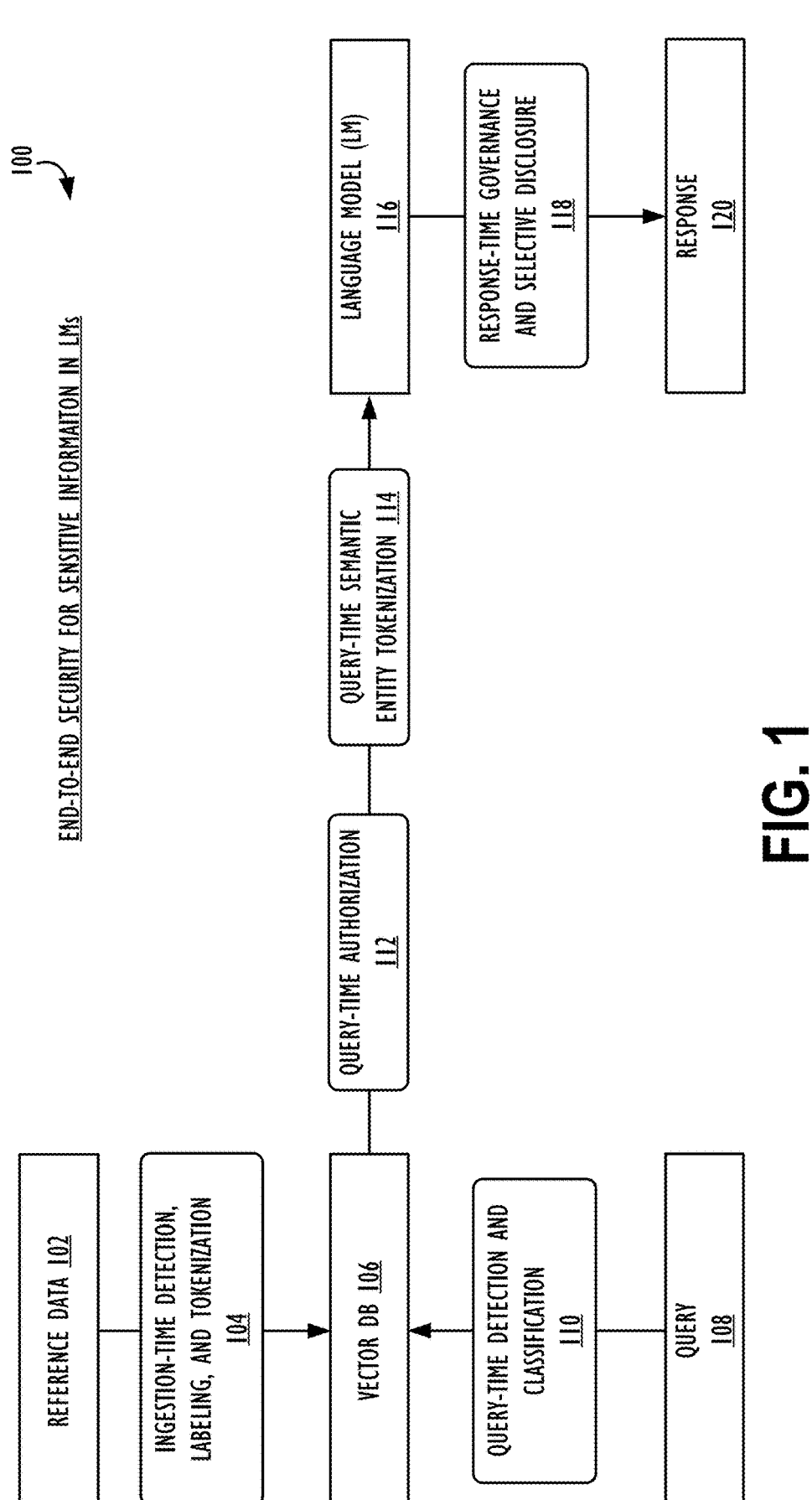
FIG. 1 illustrates a block diagram, which shows a system for performing end-to-end security for sensitive information in a particular type of AI model known as a Large Language Model (LLM), in accordance with one or more embodiments disclosed herein.

Societies in the digital era are now faced with the challenge of striking a balance between the benefits that can be obtained by freely sharing and analyzing personal data, e.g., via AI models, and the dangers that this practice poses to the privacy of the individuals whose data is concerned. Replacing original and potentially sensitive data with "pseudonymized data," i.e., personal data that has been processed in such a manner that the personal data can no longer be attributed to a specific data subject without the use of additional information (provided that such additional information is kept separately and is subject to technical and organizational measures to ensure that the personal data are not attributed to an identified or identifiable natural person), is one of the approaches that attempt to resolve this tension.

The systems and techniques described herein can serve to give users a more user-friendly capability to protect their data using tokenization and/or pseudonymization privacy/security techniques, such as the aforementioned DDIDs.

Disclosure Risk of Sensitive Data in Language Models

Language Models (LMs), ranging from small language models (SLMs) to large language models (LLMs), are powerful AI-based tools designed to recognize patterns in large datasets, enabling new insights and discoveries. However, they can inadvertently disclose sensitive information, such as personal identities or proprietary business information, through a process known as the Mosaic Effect. The Mosaic Effect occurs when unrelated data points, which appear harmless individually, are combined to reveal sensitive information by an adversary—or even during processing by the LM itself. This presents a significant challenge in maintaining data security, particularly when dealing with trade secrets or confidential business information.

Limitations of Existing Detection Methods

Traditional methods for detecting sensitive data, such as deterministic pattern-matching techniques like Regular Expressions (Regex), are limited in their ability to adapt to complex, context-dependent language structures. These methods often result in high rates of false positives (i.e., non-sensitive data being flagged as sensitive) and false negatives (i.e., sensitive data going undetected as being sensitive), especially when dealing with the variability and ambiguity inherent in natural language.

Natural Language Processing (NLP) vs. Deterministic Detection

NLP introduces improvements over deterministic methods by understanding the context in which words and phrases appear, allowing for more accurate detection of sensitive information. NLP models can distinguish between different uses of the same term (e.g., the term "Blackberry" could be correctly identified as referring to a company in a business report, but it could also refer to a confidential project name, or simply a fruit in a grocery list, e.g., based on its hierarchical classification and context) and handle variations in how sensitive data is expressed. Named Entity Recognition (NER), a key component of NLP, further enhances this capability by identifying and categorizing entities such as names, dates, and locations within the text.

However, the effectiveness of NLP systems, especially NER, is challenged by the need to scale these processes in large, AI-driven environments. As LMs and GenAI increasingly handle millions of permutations of tokens, entities, and labels, new systems and methods are required to make NER scalable and efficient in production environments.

As introduced above, the present disclosure addresses the need for scalable, context-aware detection, labeling, and protection of sensitive data in NLP environments. It introduces a hierarchical labeling system that can apply labels at multiple levels (e.g., word-level, chunk/phrase-level, and document-level) and different constructs (e.g., content versus sensitivity) to enable granular, context-sensitive protection of sensitive information. This system may be optimized using machine learning techniques to, for example, minimize false positives and false negatives and/or maximize the F1 Score, thereby improving the overall accuracy and reliability of sensitive data detection.

A Hierarchical Labeling System

According to some embodiments of a hierarchical labeling system, the following classes of labels may be used:

Word-Level Labels: Sensitive data may be identified and labeled at the individual word level. Labels may be contextually applied based on the surrounding text, ensuring that terms with multiple meanings are accurately classified.

Chunk/Phrase-Level Labels: In addition to individual words, the system applies labels at the chunk or phrase level. This allows for the annotation of sensitive data that may only be recognizable in specific phrases or combinations of words (or embedded in longer spans of text).

Document-Level Labels: Additionally, the system applies labels at the "document" level (e.g. text files, spreadsheets, images, etc.) based on the context and content of the data within the document.

Priority/Sensitivity Labels: Different levels of sensitivity (e.g., "Top Secret," "Internal Distribution Only," "General Availability," etc.) are applied based on the context and content of the data. This enables the system to tailor the protection level to the specific requirements of the data being processed.

Machine Learning Optimization

According to some embodiments, the following ML optimization techniques may be used:

Model Training: The system begins with a corpus of text that has been annotated with "ground truth" labels. This labeled data is used to train one or more machine learning models, which learn to apply the hierarchical labels accurately across a wide range of contexts.

Dynamic Label Refinement: The system uses an iterative machine learning process, such as Gradient Descent, to optimize the definition and selection of labels from a broad range of candidates, optionally generated by LMs fine-tuned for that purpose, potentially making use of Retrieval Augmented Generation (RAG) and/or Grounding. The models are trained to minimize a loss function by for example, reducing the rates of false positives and false negatives or optimizing other relevant metrics, such as precision (i.e., correctly identifying sensitive data), recall (i.e., ensuring all sensitive data is identified), and F1 Score (i.e., combining precision and recall to provide a single measure of a model's accuracy for imbalanced datasets or when both false positives and false negatives are important) to ensure the system achieves a balanced performance, considering the trade-offs between different evaluation metrics.

Continuous Learning: The system supports continuous learning, allowing it to adapt to new data and emerging patterns over time. This ensures that the detection and labeling mechanisms remain effective as language and data usage evolve.

According to some embodiments, the systems disclosed herein may preferably be designed to operate efficiently, even in large-scale, AI-driven environments. As such, systems may leverage advanced models (e.g., Bidirectional Encoder Representations from Transformers or "BERT"-like models, such as ROBERTa, DistilBERT, ALBERT, DeBERTa, etc.), distributed processing, advanced computational hardware (e.g., graphical processing units or "GPUs"), and/or parallelization techniques to handle the vast amounts of data processed by LMs and GenAI systems, ensuring that the sensitive data detection and labeling processes remain fast and reliable-even at scale.

Structured Databases and Limitations of Unstructured Data

The security architecture of structured databases is engineered to exploit the explicit structure of tabular data—e.g., tables, columns, and rows—to securely govern sensitive information. By contrast, it is impossible to directly apply the now taken-for-granted capabilities used for structured data to unstructured data, where sensitive information can literally appear anywhere within the data.

Enterprise AI governance cannot be reliably achieved through traditional orchestration-layer tools, firewalls, or response filtering. These approaches typically operate at the edges of AI workflows—i.e., before or after inference-time—but not within the inference process itself. Firewalls and access controls restrict access to systems or datasets, but they are coarse-grained and blind to the semantic sensitivity of content within unstructured inputs. Moreover, response filtering or output redaction tools act too late in the pipeline to prevent exposure, i.e., they can obscure what a model says—but not what it learns or generates based on sensitive inputs. Finally, orchestration frameworks may support workflow policies, but they do not enforce data-level protections that travel with content through embedding, retrieval, generation, and response.

In contrast, by applying structured-database-like policies to labeled unstructured data, e.g., using word-level, chunk/phrase-level, document-level, and/or priority/sensitivity labels, it is possible to deliver governance and security across every stage of generative AI—i.e., from ingestion through query and retrieval to inference and responses.

Extracting and labeling the latent semantic structure enables a spectrum of protection—i.e., not just binary access controls that grant or deny access. The techniques disclosed herein thus enforce a "policy as code" scheme, i.e., by technologically determining what content can be used and disclosed, in what form, and to whom-thereby transforming security into a dynamic, utility-preserving capability. Importantly, this approach ensures that auditability extends beyond ingestion, e.g., through embedding, retrieval, inference, and response-allowing enterprises to trace what was protected, when, and why, in accordance with any applicable enterprise policies.

To effectively govern unstructured data for secure generative AI workflows, structure must be imposed on unstructured content. For unstructured text, the underlying latent semantic structure can be extracted by detecting, labeling, and classifying sensitive data at ingestion (i.e., pre-embedding) or later in processing, such as after retrieval from a database, which enables structured database-like governance controls, such as policy-enforced authorization and data protection. As will be appreciated, effective AI governance requires protection mechanisms embedded directly into the database itself to ensure that governance is enforced consistently-regardless of where or how the data is used.

According to some embodiments, seamless integration of security may be provided at the database layer, so as to maintain privacy during an LM query process-without destroying the usefulness or value of the underlying information. Table 1, below, outlines various protection capabilities of the systems disclosed herein, and, in particular, during various LM query process stages.

TABLE 1

| LM Query Process Stage | Protection Capability |
| --- | --- |
| Ingestion-Time Detection, Labeling, & Tokenization | Granular, semantic word-level, chunk-level, and document-level detection, labeling, and classification of sensitive data at ingestion pre-embedding and tokenization post-embedding. |
| Query-Time Authorization | Policy-driven access controls, leveraging pre-embedding metadata applied to chunks and entities. |
| Query-Time Semantic Tokenization | Semantic, utility-preserving reversible tokenization directly enforced at word-level at retrieval-time, especially for untrusted LM scenarios. |
| Response-Time Governance & Selective Disclosure | Real-time detection & management of emergent (generative) sensitivity, selective token reversal, and semantic rephrasing at the word and response level. |

Ingestion-Time Granular Sensitive Data Detection, Labeling, and Tokenization: Perform granular detection, labeling, and classification of sensitive data during ingestion (pre-embedding). Metadata labeling at ingestion ensures data is immediately governable and audit ready. Tokenization of clear-text post-embedding provides additional security/privacy at-rest and in transit.

Query-Time Authorization: Enforce fine-grained, policy-driven authorization directly at query-time on tables, chunks, and individual entities, analogous to structured-database table, column, and row-level security.

Query-Time Semantic Tokenization: After authorization, apply a primary (i.e., if not yet tokenized) or secondary protection layer (i.e., if already tokenized) via policy-driven, context-aware semantic tokenization as a utility-preserving governance control over how, when, and to whom protected data is disclosed.

Response-Time (i.e., Post-Inference) Governance & Selective Disclosure: Apply policy-driven detection, labeling, classification, tokenization, and selective disclosure—including token reversal and semantic rephrasing-within inference outputs, proactively managing emergent generative sensitivity risks, and maximizing semantic accuracy and analytic utility of LM responses.

Table 2, below, provides an example of a potential scalable conceptual framework for protecting sensitive data in unstructured text, which is analogous to the use of established practices for protecting structured databases.

TABLE 2

| Structured Data | Labeled Unstructured Data |
| --- | --- |
| Table | Document or Chunk |
| Table Metadata | Document or Chunk Classification |
| Column | Entity (e.g., person, company, sensitive term) |
| Column Metadata | Entity Label |
| Row | Span of Text/Chunk |
| Query-Time Authorization | Query-Time Tokenization |

As may now be appreciated, by applying "structured-database-like" policies to labeled unstructured data, e.g., by using word-level labels, chunk/phrase-level labels, document-level labels, and/or priority/sensitivity labels, it is possible to deliver governance and security across every stage of generative AI—from ingestion through query and retrieval to inference and responses.

System for End-to-End Security for Sensitive Information in LMs

As introduced above, one critical and immediate enterprise need addressed by the techniques disclosed herein is the need for secure LM inference-time operations. Today, enterprises are focused more on securely leveraging sensitive data for LM inference rather than on model training. However, the semantic labeling and reversible protection techniques described herein enable enterprises to safely use sensitive content in LM prompts (e.g., queries and retrieved context) and responses-preserving analytic accuracy without compromising security or governance, which is an urgent and immediate market requirement.

Embodiments disclosed herein also simplify secure data sharing, thereby enabling sensitive information to flow safely across organizational boundaries-including internal teams, subsidiaries, partners, vendors, regulators, and more. By embedding structured, policy-driven protections directly into data, enterprises significantly enhance operational agility, compliance, and case of collaboration.

Turning now to FIG. 1, a block diagram 100 is shown, which illustrates a system for performing end-to-end security for sensitive information in LMs. First, reference data 102 may be obtained. As explained above, in some embodiments disclosed herein, the initially obtained reference data may comprise unstructured data.

Next, in some embodiments, at block 104, the unstructured reference data may be ingested, at which time potentially sensitive information within the unstructured reference data may be labeled and classified, and optionally tokenized. Once the granular labeling and classification of the sensitive data is completed, the now labeled unstructured data may be processed into an embedded space, e.g., in the form of a vector stored in a vector database 106. Optionally, the unstructured data may also be tokenized prior to storage in the vector database 106, as well. Separately, at block 108, a query for the LM may come in, e.g., from a third party, for which there is relevant information present in the reference data 102. Block 110 is analogous to block 104, but performs query-time detection and classification, and, if required, matching tokenization of potentially sensitive information in the incoming query. Block 112 is configured to perform query-time authorization, that is, enforce any fine-grained policy decisions directly at query time on tables, chunks, and individual entities, treating such elements analogously to traditional structured database elements, such as tables, columns, and rows, as shown in Table 2, above. Processing at block 112 may further include filtering out otherwise relevant retrieved chunks or reference data. Tokenization can be broadly or narrowly deterministic, ranging from common tokens across many use cases, users and queries, to uniquely deterministic for a single query by a particular user within a specific use case. Post-retrieval secondary tokenization of pre-storage tokens enables the use of broadly deterministic tokens for protection at rest and in transit, with use-case, user, and/or query-specific deterministic tokens for protection of data during use (i.e., at inference-time).

Block 114 is configured to perform query-time semantic entity tokenization, i.e., a process taking place after authorization, which applies tokenization to clear text sensitive data (i.e., if tokenization was not performed during reference data ingestion) or a secondary tokenization layer, e.g., via a context-aware, semantic policy. The semantic tokenization policy may serve as a utility-preserving governance control over how, when, and to whom protected data is disclosed. Across and within various embodiments, tokenization can be broadly or narrowly deterministic, ranging from common tokens across many use cases, users and queries, to uniquely deterministic for a single query by a particular user within a specific use case. In some embodiments, post-retrieval secondary tokenization of pre-storage tokens enables the use of broadly deterministic tokens for protection at rest and in transit, with use-case-, user-, and/or query-specific deterministic tokens for protection of data during use (i.e. at inference-time). As described above, according to some embodiments, the semantic tokens may take any desired form and may be used to provide context and meaning to their underlying values, e.g., in a way that ensures high-accuracy processing by the LM. In some embodiments, dynamic tokens, such as DDIDs may be used. At blocks 104, 110 and 114, information necessary to reverse tokens to the value they are used to replace is securely stored for later use, for example at block 118, as will be described below.

At block 116, the semantically tokenized data may be ingested into an LM. The roles of the LM may include to understand, process, and generate human-like text, and to perform tasks like summarization, translation, content creation, and code generation. LMs may act as information providers, analyze vast amounts of unstructured data, and automate complex or repetitive processes across various fields. The embodiments disclosed herein provide various advances over the current state of the art and, in particular, secure LM inference-time operations. The semantic labeling and reversible protection techniques described, e.g., at blocks 104 and 114, enable enterprises to safely use sensitive content in prompts (e.g., queries and retrieved context) and responses (as shown being produced at block 120), while preserving analytic accuracy without compromising security or governance (as shown being enforced at block 118).

At block 118, context-aware policies may be used to completely or selectively reverse tokens in the semantically tokenized generated response from the LM and/or to rephrase it (using the LM itself or a secondary LM), to remove tokens while preserving the meaning and utility of the response.

Additionally, another emerging and strategic use case is federated AI agents comprising specialized, domain-specific subagents. These subagents may securely exchange and reason over shared data without directly accessing underlying sensitive details. Reversible protection ensures sensitive data is securely "carried along" throughout complex AI workflows, remaining protected-yet fully usable for accurate, high-utility inference. Only at authorized endpoints, e.g., final analytic results intended for approved human users and/or intermediate or subsequent authorized workflows, can data be selectively reversed back into its original sensitive form. This enables powerful federated agent architectures, combining security, accuracy, and analytic flexibility to deliver robust outcomes at enterprise scale.

As may now be appreciated, the improvements disclosed herein may have a number of technical benefits for enterprise applications, including: (1) enabling lawful and productive use of data processing platforms; (2) limiting the amount of cleartext personal/sensitive data stored in cloud platform services and/or processed by LMs or other AI models; (3) providing a selective and variable disclosure layer for user and/or enterprise sensitive information; (4) improved accuracy via combining hierarchical labeling with machine learning optimization; (5) improved context awareness, which allows the system to accurately detect and protect sensitive data across different scenarios; and (6) improved scalability, such that the system can work effectively in large-scale environments, ensuring that sensitive data protection can keep pace with the demands of modern AI systems.

Method for End-to-End Security for Sensitive Information in LMs

Turning now to FIG. 2, a flowchart, showing a method 200 of performing end-to-end security for sensitive information in LLMs is illustrated, in accordance with one or more embodiments disclosed herein. First, at Step 202, the method 200 may analyze unstructured textual data using customizable natural language processing (NLP) techniques. Next, at Step 204, the method 200 may detect sensitive information in the unstructured textual data (e.g., according to one or more defined policies, such as enterprise-level policies).

Next, at Step 206, the method 200 may assign tokens to portions of the unstructured textual data (e.g., in the form of clear-text metadata labels) indicating sensitivity classifications, wherein the sensitivity classifications are based, at least in part, on determined context-driven meanings of the respective portions of unstructured textual data. The term "sensitivity classifications," as used herein, may include indications of a sensitivity level of a particular portion of data (e.g., "Top Secret," "Internal Distribution Only," "General Availability," etc., as described above. As described above, according to some implementations, use of NLP may assist in determining a more context-driven meaning or significance of given pieces of data, i.e., as opposed to analyzing the data in isolation.

Next, at Step 208, in some implementations, the method 200 may deterministically tokenize the detected sensitive information (e.g., prior to inference-time usage by an AI-based model), using reversible tokens configured to preserve semantic accuracy and utility (e.g., during inference-time usage by an AI-based model(s)). According to some embodiments, the tokens may comprise DDIDs, though the use of more traditional token types is contemplated, as well.

Next, at Step 210, in some implementations, the method 200 may associate provenance metadata with sensitive information (e.g., at word-level, chunk-level, document-level, etc.), wherein the provenance metadata is configured to provide for enforcement of context-sensitive access controls at AI inference-time output. Provenance metadata refers to metadata that may be used to describe or define the recorded history of the underlying data's origin, processing, and transformations throughout its lifecycle. In some implementations, this metadata may enable enforcement of selective disclosure rules based on the source of the data, i.e., instead of or in addition to selective reversal and rephrasing. Provenance metadata can also provide an audit trail of who, what, where, and when data was created, modified, and moved. Having reliable provenance metadata may be essential for data integrity, trustworthiness, and regulatory compliance, as it allows users to understand the data's lineage and verify its reliability for various application, such as AI fact-checking and system debugging.

Next, at Step 212, in some implementations, the method 200 may label sensitive content generated during LM inference and assign token-based classification metadata to such content post-inference-time and/or, if desired, enforce access control or labeling based on the provenance metadata described above.

At Step 214, in some implementations, the method 200 may selectively reverse tokenized content and, if desired, semantically rephrase (or even re-tokenize) portions of an AI model's post-inference output (e.g., based on defined context-specific access control policies).

Finally, in some implementations, at Step 216, the method 200 may optionally enforce database query authorization by applying sensitivity classification tokens to unstructured data segments in the post-AI inference-time content and restricting access (e.g., via tokenization and/or access control according to one or more defined policies specifying what parties and/or in what contexts certain database information may be queried and/or revealed in its original form).

The present disclosure offers a scalable hierarchical labeling solution in NLP environments for applying context-sensitive labels at different levels of granularity to enforce a nuanced treatment of sensitive data, which can also adapt to varying contexts. This granular approach represents a significant improvement over simpler, less flexible methods. It provides a robust mechanism for protecting sensitive information in AI-driven systems, while minimizing the risks associated with sensitive data disclosure by leveraging hierarchical labeling, machine learning optimization, and context-aware processing, among other techniques.

Example Electronic Devices

FIG. 3 is an example of a simplified functional block diagram illustrating a programmable device 300 according to one embodiment that can implement one or more of the processes, methods, steps, features or aspects described herein. The programmable device 300 may include one or more communications circuitry 310, memory 320, storage device 330, processor 340, controlling entity interface 350, display 360, and communications bus 370. Processor 340 may be any suitable programmable control device or other processing unit, and it may control the operation of many functions performed by programmable device 300. Processor 340 may drive display 360 and may receive controlling entity inputs from the controlling entity interface 350. An embedded processor provides a versatile and robust programmable control device that may be utilized for carrying out the disclosed techniques.

Storage device 330 may store attribute combinations, software (e.g., for implementing various functions on device 300), preference information, device profile information, and any other suitable data. Storage device 330 may include one or more storage mediums for tangibly recording data and program instructions, including for example, a hard-drive or solid-state memory, permanent memory such as ROM, semi-permanent memory such as RAM, or cache. Program instructions may comprise a software implementation encoded in any desired computer programming language.

Memory 320 may include one or more different types of storage modules that may be used for performing device functions. For example, memory 320 may include cache, ROM, and/or RAM. Communications bus 370 may provide a data transfer path for transferring data to, from, or between at least memory 320, storage device 330, and processor 340.

Although referred to as a bus, communications bus 370 is not limited to any specific data transfer technology. Controlling entity interface 350 may allow a controlling entity to interact with the programmable device 300. For example, the controlling entity interface 350 can take a variety of forms, such as a button, keypad, dial, click wheel, mouse, touch or voice command screen, or any other form of input or user interface.

In one embodiment, the programmable device 300 may be a programmable device capable of processing data. For example, the programmable device 300 may be a device such as any identifiable device (excluding smart phones, tablets, notebook and desktop computers) that have the ability to communicate and are embedded with sensors, identifying devices or machine-readable identifiers (a "smart device"), smart phone, tablet, notebook or desktop computer, or other suitable personal device.

Figure 4:
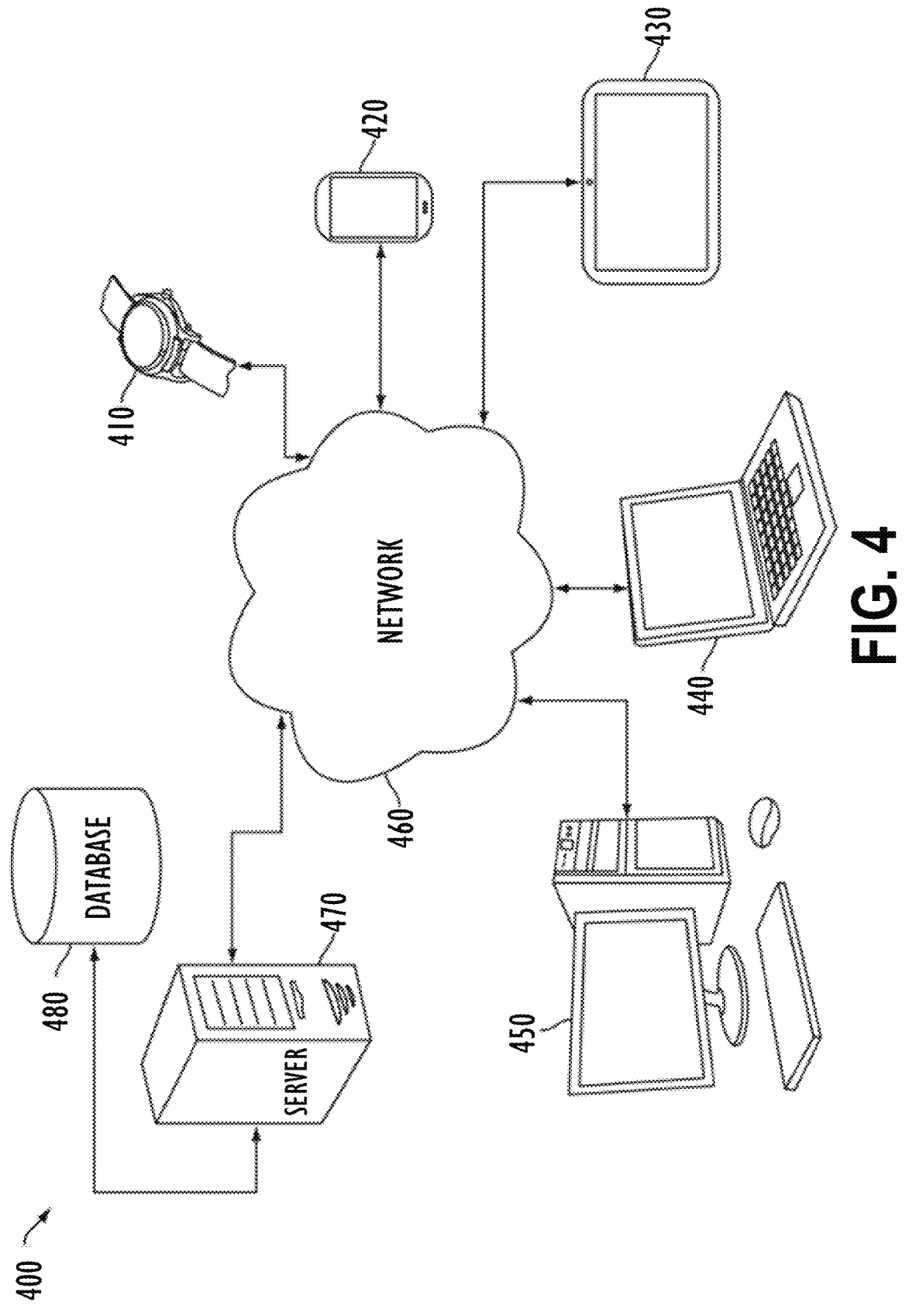
FIG. 4 illustrates a block diagram illustrating a network of clients and a server for implementing techniques for performing end-to-end security for sensitive information in LLMs, in accordance with one or more embodiments disclosed herein.

FIG. 4 is an example of a block diagram illustrating a system 400 of networked devices for implementing one or more of the processes, methods, steps, features or aspects described herein. A client application may be implemented on any of the smart device (i.e., wearable, movable or immovable smart devices) 410, smart phone 420, tablet 430, notebook 440, or desktop computer 450, for example. Each of these devices is connected by one or more networks 460 to the privacy server 470, to which is coupled a database 480 for storing synthetic datasets or other relevant information. The database 480 may be any desired form of data storage, including structured databases and non-structured flat files. The privacy server 470 may also provide remote storage for synthetic datasets or other relevant information that has been or will be delivered to the clients on devices 410, 420, 430, 440, 450, or other suitable devices either in the database 480 or in a different database (not shown).

Although a single network 460 is illustrated in FIG. 4, the network 460 may be multiple interconnected networks, and the privacy server 470 may be connected to each of the clients on 410, 420, 430, 440, 450, or other suitable devices via different networks 460. The network 460 may be any type of network, including local area networks, wide area networks, or the global Internet.

Additional Examples

According to Example 1, a system is disclosed, comprising: a memory having, stored therein, computer program code; and one or more processing units operatively coupled to the memory and configured to execute instructions in the computer program code that cause the one or more processing units to: analyze unstructured textual data using at least one natural language processing (NLP) technique; detect sensitive information in the unstructured textual data according to at least one defined policy; and assign tokens to portions of the unstructured textual data indicating sensitivity classifications, wherein the sensitivity classifications are based, at least in part, on determined context-driven meanings of the respective portions of unstructured textual data.

According to Example 2, a system in accordance with Example 1 is disclosed, wherein the portions of the unstructured textual data comprise at least one of the following: individual words; compound words; word phrases; chunks of data; documents; or files.

According to Example 3, a system in accordance with Example 1 is disclosed, wherein the tokens comprise metadata labels.

According to Example 4, a system in accordance with Example 1 is disclosed, wherein the instructions in the computer program code further cause the one or more processing units to: tokenize the detected sensitive information using reversible tokens configured to preserve semantic accuracy and utility during artificial intelligence (AI) inference-time usage (e.g., wherein the tokenization happens pre-inference-time by an AI-based model).

According to Example 5, a system in accordance with Example 4 is disclosed, wherein the reversible tokens are deterministic within a policy-defined context scope.

According to Example 6, a system in accordance with Example 4 is disclosed, wherein the reversible tokens comprise temporally unique dynamically changing de-identifiers (DDIDs).

According to Example 7, a system in accordance with Example 1 is disclosed, wherein the instructions in the computer program code further cause the one or more processing units to: associate provenance metadata with at least some of the detected sensitive information (e.g., at the word-level, chunk-level, document-level, etc.), wherein the provenance metadata is configured to provide for enforcement of context-sensitive access controls to the respective sensitive information at AI inference-time output.

According to Example 8, a system in accordance with Example 1 is disclosed, wherein the instructions in the computer program code further cause the one or more processing units to: label sensitive content generated during AI inference-time output; and assign token-based classification metadata to the labeled sensitive content post-AI inference-time.

According to Example 9, a system in accordance with Example 8 is disclosed, wherein the instructions in the computer program code further cause the one or more processing units to: selectively reverse at least some tokenized post-inference-time content (e.g., based on defined context-specific access control policies).

According to Example 10, a system in accordance with Example 9 is disclosed, wherein the instructions in the computer program code further cause the one or more processing units to: semantically rephrase at least some of the tokenized post-AI inference-time content.

According to Example 11, a system in accordance with Example 9 is disclosed, wherein the instructions in the computer program code further cause the one or more processing units to: tokenize at least some data in the post-AI inference-time content.

According to Example 12, a system in accordance with Example 9 is disclosed, wherein the instructions in the computer program code further cause the one or more processing units to: enforce database query authorization by applying token-based classification metadata to unstructured textual data in the post-AI inference-time content (and, e.g., tokenize sensitive data or otherwise restrict access according to a defined policy).

Other Examples include non-transitory program storage devices and/or computer-implemented methods in accordance with Examples 1-12, listed above.

Additional Comments

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention. For instance, as a non-limiting example, in alternative embodiments, portions of operations described herein may be re-arranged and performed in different order than as described herein.

It should be appreciated that reference throughout this specification to "one embodiment" or "an embodiment" or "one example" or "an example" means that a particular feature, structure or characteristic described in connection with the embodiment may be included, if desired, in at least one embodiment of the present invention. Therefore, it should be appreciated that two or more references to "an embodiment" or "one embodiment" or "an alternative embodiment" or "one example" or "an example" in various portions of this specification are not necessarily all referring to the same embodiment. Furthermore, the particular features, structures or characteristics may be combined as desired in one or more embodiments of the invention.

It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed inventions require more features than are expressly recited in each claim. Rather, inventive aspects lie in less than all features of a single foregoing disclosed embodiment, and each embodiment described herein may contain more than one inventive feature.

While the invention has been particularly shown and described with reference to embodiments thereof, details may be made without departing from the spirit and scope of the invention.

The invention claimed is:

1. A system, comprising:
a memory having, stored therein, computer program code; and one or more processing units operatively coupled to the memory and configured to execute instructions in the computer program code that cause the one or more processing units to:
analyze unstructured textual data using at least one natural language processing (NLP) technique;
detect sensitive information in the unstructured textual data according to at least one defined policy;
assign tokens to portions of the unstructured textual data indicating sensitivity classifications, wherein the sensitivity classifications are based, at least in part, on determined context-driven meanings of the respective portions of unstructured textual data;
label sensitive content generated during AI inference-time output; and
assign token-based classification metadata to the labeled sensitive content post-AI inference-time.

2. The system of claim 1, wherein the portions of the unstructured textual data comprise at least one of the following: individual words; compound words; word phrases; chunks of data; documents; or files.

3. The system of claim 1, wherein the tokens comprise metadata labels.

4. The system of claim 1, wherein the instructions in the computer program code further cause the one or more processing units to:
tokenize the detected sensitive information using reversible tokens configured to preserve semantic accuracy and utility during artificial intelligence (AI) inference-time usage.

5. The system of claim 4, wherein the reversible tokens are deterministic within a policy-defined context scope.

6. The system of claim 4, wherein the reversible tokens comprise temporally unique dynamically changing de-identifiers (DDIDs).

7. The system of claim 1, wherein the instructions in the computer program code further cause the one or more processing units to:
associate provenance metadata with at least some of the detected sensitive information, wherein the provenance metadata is configured to provide for enforcement of context-sensitive access controls to the respective sensitive information at AI inference-time output.

8. The system of claim 1, wherein the instructions in the computer program code further cause the one or more processing units to:
selectively reverse at least some of the tokenized post-AI inference-time content.

9. The system of claim 8, wherein the instructions in the computer program code further cause the one or more processing units to:
semantically rephrase at least some of the tokenized post-AI inference-time content.

10. The system of claim 8, wherein the instructions in the computer program code further cause the one or more processing units to:
tokenize at least some data inof the post-AI inference-time content.

11. The system of claim 8, wherein the instructions in the computer program code further cause the one or more processing units to:
enforce database query authorization by applying token-based classification metadata to at least some of the post-AI inference-time content.

12. A non-transitory program storage device comprising instructions stored thereon to cause one or more processors to:

analyze unstructured textual data using at least one natural language processing (NLP) technique;

detect sensitive information in the unstructured textual data according to at least one defined policy; and assign tokens to portions of the unstructured textual data indicating sensitivity classifications, wherein the sensitivity classifications are based, at least in part, on determined context-driven meanings of the respective portions of unstructured textual data; and associate token-based provenance metadata with at least some of the detected sensitive information, wherein the token-based provenance metadata is configured to provide for enforcement of context-sensitive access controls to the respective sensitive information post-AI inference-time.

13. The non-transitory program storage device of claim 12, wherein the instructions further cause the one or more processors to:

tokenize the detected sensitive information using reversible tokens configured to preserve semantic accuracy and utility during AI inference-time usage.

14. The non-transitory program storage device of claim 13, wherein the reversible tokens are deterministic within a policy-defined context scope.

15. The non-transitory program storage device of claim 12, wherein the instructions further cause the one or more processors to:

label sensitive content generated during AI inference-time output; and assign token-based classification metadata to the labeled sensitive content post-AI inference-time.

16. The non-transitory program storage device of claim 15, wherein the instructions further cause the one or more processors to:

selectively reverse at least some of the tokenized post-AI inference-time content.

17. The non-transitory program storage device of claim 16, wherein the instructions further cause the one or more processors to:

semantically rephrase at least some of the tokenized post-AI inference-time content.

18. The non-transitory program storage device of claim 16, wherein the instructions further cause the one or more processors to:

tokenize at least some of the post-AI inference-time content.

19. The non-transitory program storage device of claim 12, wherein the instructions further cause the one or more processors to:

enforce database query authorization by applying token-based classification metadata to at least some of the post-AI inference-time content.

20. A computer-implemented method, comprising:

analyzing unstructured textual data using at least one natural language processing (NLP) technique;

detecting sensitive information in the unstructured textual data according to at least one defined policy;

assigning tokens to portions of the unstructured textual data indicating sensitivity classifications, wherein the sensitivity classifications are based, at least in part, on determined context-driven meanings of the respective portions of unstructured textual data;

labeling sensitive content generated during AI inference-time output; and assigning token-based classification metadata to the labeled sensitive content post-AI inference-time.

21. The computer-implemented method of claim 20, further comprising:

tokenizing the detected sensitive information using reversible tokens configured to preserve semantic accuracy and utility during inference-time usage.

22. The computer-implemented method of claim 21, wherein the reversible tokens comprise temporally unique dynamically changing de-identifiers (DDIDs).

23. The computer-implemented method of claim 22, further comprising:

associating provenance metadata with at least some of the detected sensitive information, wherein the provenance metadata is configured to provide for enforcement of context-sensitive access controls to the respective sensitive information at AI inference-time output.

24. The computer-implemented method of claim 21, further comprising:

selectively reversing at least some of the tokenized post-AI inference-time content.

25. The computer-implemented method of claim 24, further comprising:

semantically rephrasing at least some of the tokenized post-AI inference-time content.

26. The computer-implemented method of claim 24, further comprising:

tokenizing at least some of the post-AI inference-time content.

27. The computer-implemented method of claim 20, further comprising:

enforcing database query authorization by applying token-based classification metadata to at least some of the post-AI inference-time content.

* * * * *